May 12, 1964 J. R. RICHARDS ETAL 3,132,403
CONCRETE BEAM MOLDING APPARATUS
Filed June 22, 1961 4 Sheets-Sheet 1
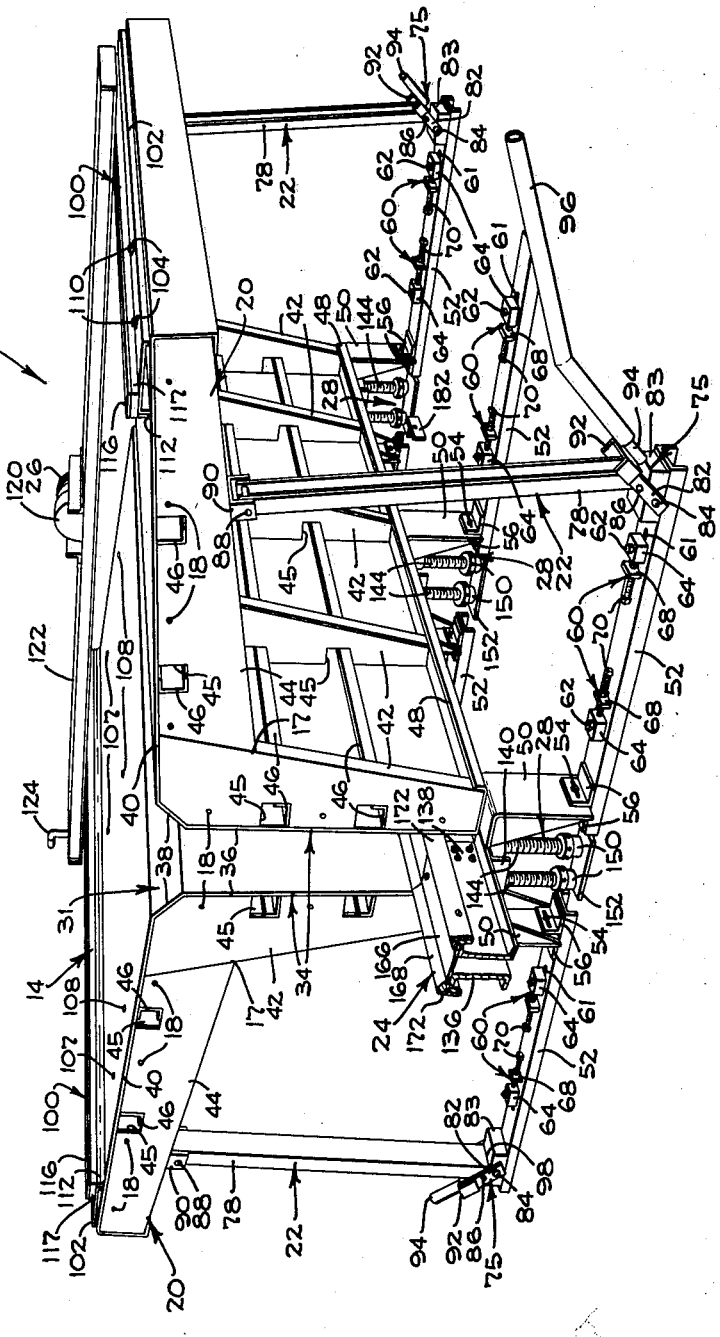
FIG_1
INVENTORS
JOHN R. RICHARDS
EDGAR G. M. DYKEMAN
EDWARD K. RICE
BY
ATTORNEY

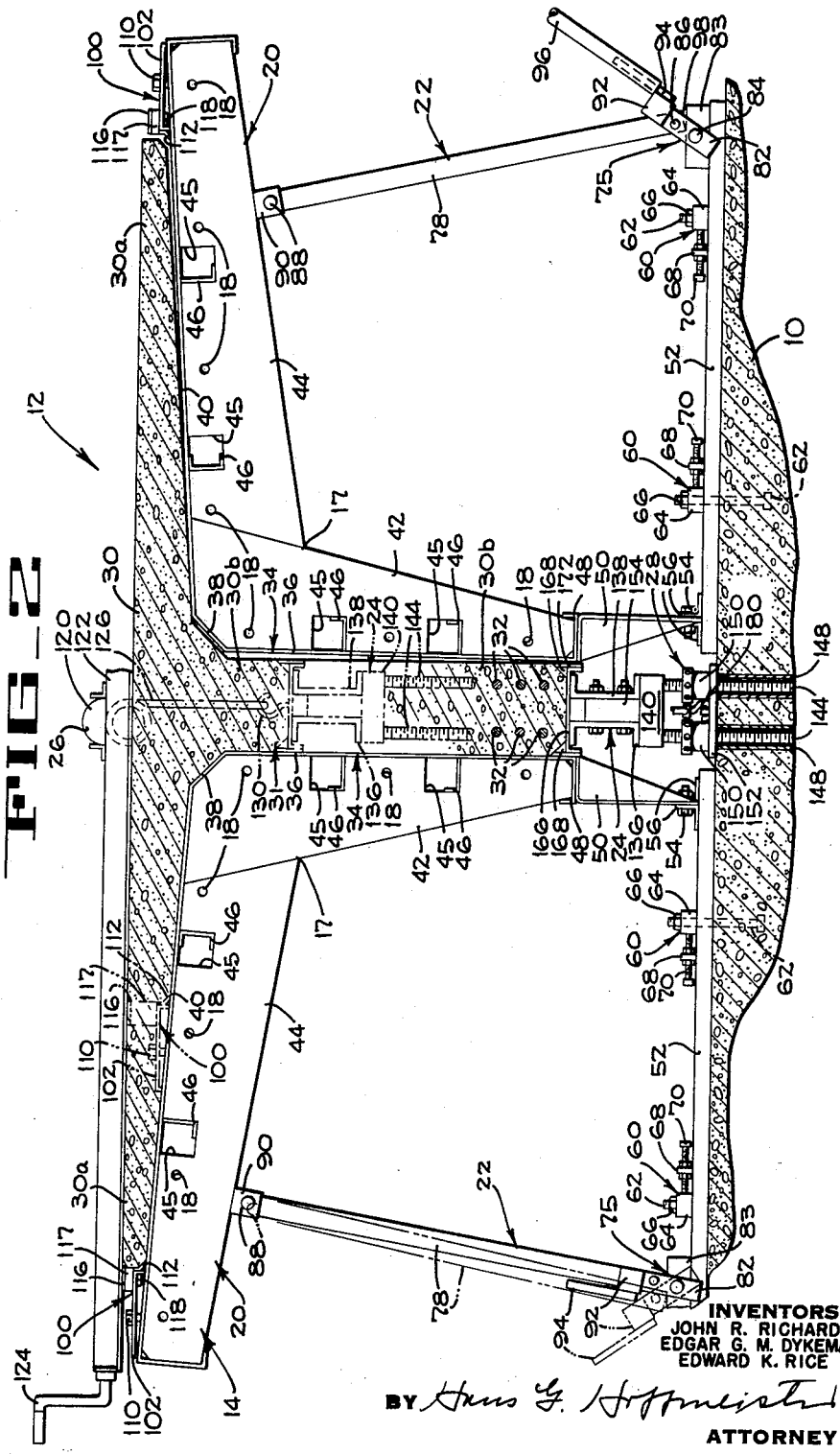

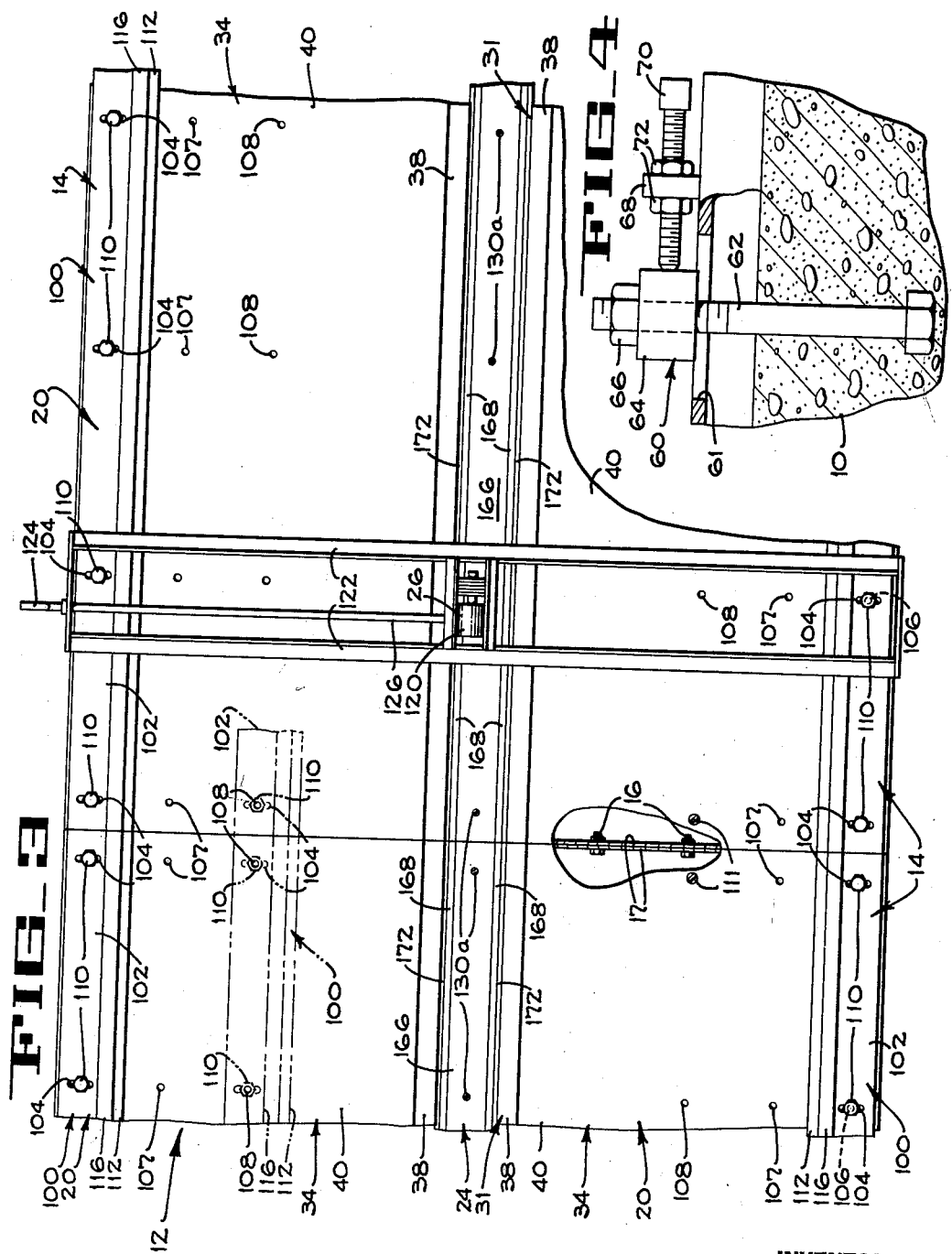

May 12, 1964
J. R. RICHARDS ETAL
3,132,403
CONCRETE BEAM MOLDING APPARATUS
Filed June 22, 1961
4 Sheets-Sheet 4
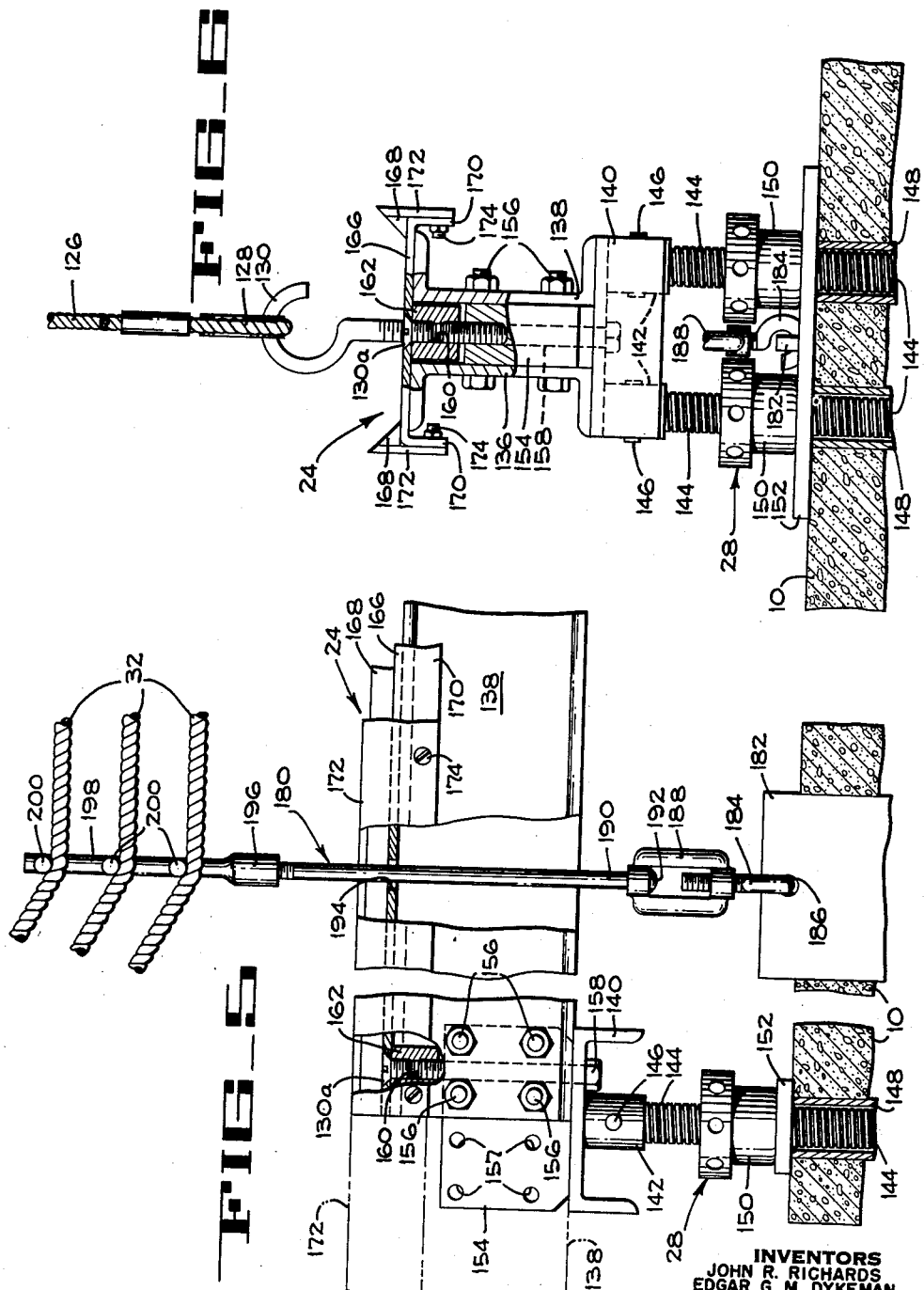
INVENTORS
JOHN R. RICHARDS
EDGAR G. M. DYKEMAN
EDWARD K. RICE
BY Hans G. Hoffmeister
ATTORNEY 3,132,403
CONCRETE BEAM MOLDING APPARATUS
John R. Richards and Edgar G. M. Dykeman, Riverside, and Edward K. Rice, Los Angeles, Calif., assignors to FMC Corporation, a corporation of Delaware
Filed June 22, 1961, Ser. No. 118,945
1 Claim. (Cl. 25—118)

This invention pertains to concrete structural members and in particular relates to apparatus for molding concrete beams of T-shaped cross-section.

T-beam molding apparatus presently in use is often cumbersome to use and it is difficult and time consuming to adjust the dimensions of the beams that can be molded therein.

An object of the invention is to provide an improved apparatus for molding concrete beams.

Another object of the invention is to provide molding apparatus which is readily adjustable to permit variation of the dimensions thereof so that beams of various dimensions can be cast therein.

A further object is to provide molding apparatus wherein the adjustable parts are easily manipulated.

Another object of the invention is to provide adjustable concrete molding apparatus which has an adjustable bottom form or pallet liner and which is not subject to excessive concrete leakage.

Another object of the invention is to provide an improved bottom form or pallet liner for concrete molding apparatus.

These and other objects and advantages of the invention will be apparent from the description and the accompanying drawings, in which:

FIG. 1 is a perspective of one section of the molding apparatus of the present invention for molding a concrete T-beam.

FIG. 2 is an end elevation of the apparatus and illustrates a cast concrete T-beam in the apparatus.

FIG. 3 is a top plan of portions of two connected sections of the molding apparatus.

FIG. 4 is an elevation on an enlarged scale of one of a set of support-channel adjustment mechanisms.

FIG. 5 is a side elevation of the pallet liner of the invention and illustrates the pallet liner supporting mechanism and the cable stressing mechanism.

FIG. 6 is an end elevation of the pallet liner and the temporary supporting mechanism attachment, with the cable stressing mechanism broken away.

Referring to the drawings, a horizontal concrete casting bed 10 (FIG. 2) supports the concrete-beam molding apparatus 12 (FIG. 1) of the invention and the beams cast therein. As seen in FIG. 3, the completed molding apparatus 12 is made up of a plurality of individual molding sections 14 (one such section being shown in FIG. 1), connected together in end-to-end abutment by bolts 16 fastened through several aligned holes 18 (FIGS. 1 and 2) in end plate structure 17 provided at the ends of each of the sections. In one embodiment of the invention, sections 14 are 20 feet long. Each section 14 comprises a pair of L-shaped side forming members indicated generally at 20, which are pivotally supported near their lower edges and tilt into and out of molding position under the control of toggled struts 22 (FIGS. 1 and 2). The bottom of the molding apparatus is closed by a multi-section pallet liner 24 which can be raised and temporarily supported by one or more winches 26, and which is permanently supported, by a plurality of screw uspport mechanisms 28. The pallet liner 24 serves as the bottom form wall and it also supports the finished beam 30 (FIG. 2) when the side forming members 20 are tilted apart for stripping the beam from the apparatus. The structural details of the pallet liner will be explained more fully as this specification proceeds.

Since a number of sections 14 are connected in end-to-end relation, to provide a long channel-like cavity 31, the molding cavity 31 may be partitioned at intervals to provide several individual cavities for concurrently molding several beams of desired length.

Stressing cables, such as cables 32 (FIG. 2) are placed in the elongate molding cavity 31 of the apparatus if prestressed T-beams 30 are to be cast. The cables extend the full length of the apparatus 12 and are common to all of the beams being cast in the several individual molding cavities. In accordance with conventional practice, the cables are anchored at one end of the molding apparatus 12, externally of the end of the mold by means not shown. The cables are tensioned by a tensioning device (not shown) located at the other end of the apparatus.

The two side forming members 20, which comprise a molding section 14 of the invention, face each other on the casting bed 10 and are separated sufficiently to accommodate the pallet liner 24 between them. The two side forming members 20 are of identical construction, therefore, only one will be described in detail. Each side forming member 20 is constructed of a steel sheet 34 (FIGS. 1, 2, and 3) bent longitudinally to provide a vertical wall 36, a narrow oblique wall 38 and a substantialy horizontal wall 40. The slabs 30a of the beam 30 (FIG. 2) forming the cross bar of the T are made to taper toward their outer endges by inclining the walls 40 of members 20 upward and outward. Welded to the undersurfaces of the wall 40 of each side forming member 20 are five vertical stiffening plates 42 and five substantially horizontal stiffening plates 44. The vertical and the horizontal stiffening plates 42 and 44 are notched at 45 to receive angle members 46 which extend longitudinally of the apparatus. The steel sheet 34, stiffeners 42, 44 and channels 46 are welded together to provide a side forming member 20 that is quite rigid. The outer sets of plates 42, 44 form the end walls 17, previously referred to.

Welded to the lower surfaces of each of the five vertical stiffening members 42 is a reinforcing plate 48. The reinforcing plate 48 extends the full length of the side forming member 20. Support brackets 50 are welded at the center and at each end of the reinforcing plate 48. The three support brackets 50 on each side member 20 are each supported on a horizontal support channel 52 that rests on the casting bed 10. A pair of opposed angle members 56 are welded to the inner end of each support channel 52 at the associated bracket 50, and are drilled to receive a blot 54 which passes through a hole in the vertical supoprt member 50 and through the upstanding legs of the angle members 56. The upstanding legs of each pair of angle members 56 are spaced to loosely receive the bracket 50 therebetween. This construction permits a limited amount of rocking or pivotal movement of each side forming member 20 at the bolts 54.

The three support channels 52 which support each side forming member 20 (FIG. 2) are adjustable laterally on the casting bed 10 under the control of opposed adjustment mechanisms 60 (FIGS. 1, 2, and 4). The separation of the two side forming members 20 is adjusted by moving the several supporting channels 52 closer together or farther apart on the casting bed 10. As seen in FIG. 4, slots 61 are cut in each of the support channels 52 and a threaded hold down bolt 62, which is embedded in the concrete of the casting bed, extends through each slot 61. Combined clamp and thrust collars 64 are retained on bolts 62 by nuts 66. To provide the adjustment, ears 68 are welded to the upper surface of the support channel 52 adjacent each collar 64 associated therewith. An adjusting bolt 70 extends through an opening in each of the ears 68 and threaded nuts 72 on each side of the ears 68 engage the bolts 70. The bolts 70 are adjusted to bear against a respective collar 64. Precise lateral adjustment of each support channel 52 is thereby effected. It will be apparent that the adjustment mechanisms 60 cooperate to positively maintain the side forming members 20 in any position of lateral adjustment to which they may be moved.

Each molding section 14 is opened to release the T-beams 30 cast therein, by tilting back the two side forming members 20, under the control of the toggle strut mechanisms 22, on their respective pivot bolts 54. This releases or strips the forming walls, 36, 38, and 40 of each side forming member 20 from the associated faces of a cast beam 30 (note the separation of the member 20 from the beam 30 at the right side of FIG. 2), and permits the beam to be readily removed. A toggle strut mechanism 22 is located at each of the four corners of a molding section 14 and each includes a toggle joint 75 and a strut 78. Each toggle joint 75 is operable to assume either an erect position as shown on the left side of FIG. 2, or alternatively, an outwardly tilted position as shown on the right side of FIG. 2 (and in phantom lines on the left side of FIG. 2). In moving to the erect position, the toggle joint or knuckle 75 and the connected strut 78, raise or erect the side forming member 20 and cause the inner surface of the wall 36 of the member 20 to tightly engage the adjacent lateral edge of the pallet liner 24. In the tilted apart or open position of the knuckles 75, the side forming members 20 are tilted apart, to the extent permitted by the strut 78 and in this position the cast beam is easily removed from the apparatus.

Each toggle joint or knuckle 75 comprises a pair of parallel short links 82 which are pivotally connected to a metal block 83 by a pivot pin 84. The block 83 is welded to the end of the associated support channel 52. The links 82 are each pivotally connected to the lower end of a strut 78 by a pivot pin 86. The struct 78 is connected at its upper end to a pivot pin 88 carried in a U-shaped bracket 90. The U-shaped bracket 90 is welded to the horizontal stiffening member 44 at the associated corner of the side forming member 20. A U-shaped bracket 92 is welded to the upper ends of the links 82 above the pivot pin 86. A short operating handle 94 is welded to the U-shaped bracket 92 and provides a convenient means for opening and, alternatively, erecting the toggle joint 75. Mechanical advantage for operating the toggle joint 75 is achieved by using a handle extension such as a pipe 96 of appropriate size. To move the side forming member 20 to the open position, the links 82 and the handle 94 connected thereto are swung outward (FIG. 2) until the lower end 98 of the strut 78 strikes the upper face of the block 83 attached to the support channel. In this, the open position, the weight of a side forming member 20 is directly transmitted to the casting bed 10 through the struts 78. To move the side forming members 20 to the erect or closed position, the handles 94 are swung inward to the position illustrated at the left of FIG. 2. The pivot pins 86 during erection move slightly past the line connecting pins 84 and 88, and the toggle joint 75 can be said to snap over-center. Abutment of the U-shaped bracket 92 with the strut 78 maintains the toggle support mechanism 22 in its over-center condition. With the several toggle support mechanisms 22 in their over-center condition, the weight of each side forming member 20 and the concrete therein is transmitted through the struts 78, the blocks 83, and the support channels 52, to the casting bed 10. The toggle support mechanisms 22 are so securely locked in their erect positions by this over-center action that they will not accidentally open. The weight of the concrete and of the side forming member itself urges the U-shaped brackets 92 against the respective struts 78.

The pivot axis of each side forming member 20 is located a substantial distance below the plane of the upper surface of the pallet liner 24. With this construction a considerable force can be exerted against the lateral edges of the pallet liner 24 by the walls 36 of the side forming members 20, when the mold is closed. A tightly sealed joint is thus established between the opposed walls 36 and the lateral surfaces of the pallet liner 24 to prevent concrete leakage therebetween.

The present apparatus is adjustable for the production of beams having a wide range of dimensions. The width dimension of the slab 30a of the T-beam 30 to be cast, is determined by the adjustment of two laterally and vertically adjustable side members 100 (FIGS. 1, 2, and 3), forming lateral walls of the mold. The members 100 are mounted on the horizontal walls 40 of the molding sections 14, and extend the full length of the beam to be cast. Each side member 100 includes a channel 102 having transverse slots 104 (FIG. 3) therein. Three series or rows of holes 106, 107, and 108 are drilled into each wall 40 and the holes in each row are spaced so that they are aligned with the slots 104 in the channel member 102. Bolts 110 are placed in the slots 104 and are adapted to connect the guide members 102 to the wall 40 at one of the rows of holes 106, 107, or 108. The connection is made to the row of holes 106 if the molding section 14 is to be used to cast a beam having a slab width of approximately eight feet. The row of holes 107 is used if the molding section 14 is to cast a beam having a slab width of approximately six feet. The row of holes 108 is used to cast a beam having a slab width on the order of four feet. Thus a T-beam having a slab width ranging from less than four feet to more than eight feet can be cast with the apparatus of the invention by connecting the channels 102 to the appropriate row of holes 106, 107, or 108 and laterally adjusting each channel 102 on the bolts 110 before the bolts are tightened. Leakage of concrete out of holes in the row 108 or 107, is prevented by placing a countersunk screw 111 (FIG. 3) in each of the holes. A fillet member 112, welded to the inner face of each channel 102, bevels the lower edge of the slab 30a (FIG. 2) of the T-beam.

The thickness of the slab 30a of the T-beam 30 to be cast in the apparatus, is determined by the relative elevation of screeding strips 116, one of which is mounted upon each of the channels 102 with the inner edge of the strip 116 in vertical alignment with the inner face of the associated fillet member 112, as best seen in FIG. 2. Between each screeding strip 116 and the associated channel 102 is a spacing strip 117 (FIG. 2). The slab thickness of the beam is predetermined by selecting spacing strips 117 of the desired thickness. Bolts 118 are welded to the undersurface of the screeding strip 116 and pass through holes in the spacing strips 117 and are secured by nuts to the channel member 102.

The thickness or width dimension of the stem 30b of the T-beam 30 is adjusted by adjusting the separation of walls 36 by means of the support channels 52, as previously described. The depth dimension of the stem 30b of the T-beam must also be selected to fit design requirements, and beams 30 having various depth dimensions are cast by adjusting the elevation of the pallet liner 24 above the casting bed 10.

The pallet liner 24 comprises a pair of channels 136 and 138 (FIGS. 1, 5, and 6) of any convenient length, unit lengths of 20 feet being typical. The channels are supported at their ends and at an intermediate point on screw support assemblies 28 (FIG. 1).

Each support assembly includes a short lateral channel or pallet liner support plate 140. Sockets 142 are welded to each plate 140 for receiving the upper ends of long screws 144. A pin 146 passing through the side wall of each socket 142 and the respective screw 144 retains the screw 144 in its socket.

The screws 144 of each screw support mechanism 28 are received in tubular wells 148 leading downwardly from the surface of the casting bed 10, and the screws and wells are sufficiently long to permit the pallet liner 24 to be adjusted vertically through a range of several feet. The lowermost position of the pallet liner 24 is illustrated in solid lines in FIG. 2, whereas an upper position is shown in phantom. A nut 150 on each screw 144 bears against a collar 152 resting on the casting bed 10, and the several nuts 150 support the pallet liner 24 during the molding steps. Fine height adjustments of the pallet liner 24 can be made by turning the nuts 150 with a spanner.

The channel beams 136 and 138 of each pallet liner section are spliced to provide a continuous beam. The splices are made at end support members 140 (FIG. 5) and a splice block 154 is used to join the beams. Four holes are drilled into the end of each channel beam and the splice block 154 is correspondingly drilled to have four holes 157 at each end thereof to receive bolts 156 which fasten the channel beams to the splice block.

The splice blocks 154 are connected to the associated support plates 140 by bolts 158 (one being shown in FIG. 5). The bolts 158 each pass vertically through the support plate 140 and the splice block 154 and are received in a threaded hole 160 (FIG. 6) in a cover plate block 162 (FIGS. 5 and 6). The bolts 158 are of such length that the upper portion of the threaded hole 160 is free to receive a flathead screw 130a (FIGS. 3 and 5) or the shank of a hook 130 (FIG. 6) therein.

A cover plate 166 having a width selected to provide the required thickness of the stem 30b of the T-beam 30 (FIG. 2) to be cast, is mounted on the upper surfaces of the channel beams 136 and 138. The cover plate 166 has the blocks 162 welded thereto and is connected to the channel beams by the described bolts 158 threaded into blocks 162.

The cover plate 166 has a fillet strip 168 welded longitudinally along each side of its upper edge; the fillets 168 chamfer the lower longitudinal edge of the stem 30b of the beam. The cover plate 166 also includes a pair of down-turned flanges 170. Resilient sealing strips 172 formed of neoprene or a similar rubber-like material are fastened to the respective flanges 170 by several short countersunk screws 174.

The sealing strips 172 of the cover plate 166 are engaged by the inner surfaces of the respective vertical walls 36 (FIG. 1 and 2) of the side forming members 20 when the members are tilted together under the control of the toggle support mechanisms 22. In their closed positions, the side forming members 20 tightly engage the resilient sealing strips 172 and a leak-proof joint is achieved, as previously described. At least one of the side forming members 20 must be in its open position before the pallet liner 24 can be vertically adjusted. When suitable end plates (not shown) are bolted to the end walls 17 of the apparatus 12, it will be in condition to receive concrete. The mold is closed before the end plates are fitted.

As previously mentioned, initial adjustment of pallet liner elevation is under the control of several manually-operated winches 26, there being one winch for every 50 feet of form. Each winch mechanism comprises a hoist 120 carried in a frame 122 that is placed laterally across the form 12 and rests on the screeding strips 116. The hoist 120, which includes a drum and gearing, can be of conventional design. A handle 124 for the hoist is operated to raise or lower a cable 126 having an eye 128 at its free end. The cable eye 128 of each winch mechanism 26 is hooked over a hook 130 (FIG. 6) which, as above mentioned is screwed into the pallet liner 24. Two or more winch mechanisms 26 are connected to hooks 130 of the pallet liner and the pallet liner is raised or lowered by operating the handles 124.

In operation, when an adjustment is to be made, the pallet liner 24 is raised to free nuts 150, which can be freely run along their screws 144 to support the pallet liner at the desired elevation. The pallet liner is then lowered, and cables 126 are slipped off of hooks 130, and the winch mechanisms 26 are removed from the apparatus 12. Hooks 130 are removed and replaced by flathead screws 130a (FIG. 5). Fine elevation adjustment is made with a spanner and nuts 150.

Most T-beams 30 cast in the apparatus will be pretensioned, using stressing members such as the steel cables 32 (FIGS. 2 and 5). As mentioned, the cables are anchored at one end of the apparatus by conventional anchor means (not shown) and the other ends to a tensioning machine (not shown). The cables 32 are vertically positioned at intermediate points between the beam ends by deflecting units 180 (FIG. 5) provided at the required points along the length of the mold.

Each cable deflecting unit 180 (FIG. 4) comprises an anchor plate 182 embedded in the concrete casting bed 10 and a hook 184 which fits in a hole 186 in the anchor plate 182. The shank of hook 184 is threaded and engages a turnbuckle 188. The turnbuckle 188 is mounted on a bolt 190 having a head 192, and the turnbuckle is free to turn on the bolt. Bolt 190 passes between the pair of channel beams 136 and 138 and through an opening 194 in the pallet liner cover plate 166 and is threaded into a socket 196 in a cable harp 198. The cables 32 are strung below lateral bars 200 of the cable harp 198 and the deflecting mechanism 180 retains the cables in the selected location. The turnbuckles 188 can be turned to precisely locate and/or adjust the tension of the cables.

When the cables are properly located in the apparatus and have been stressed to the required degree, the concrete can be poured into the molding cavity 31. After the concrete hardens, the cable deflecting mechanisms 180 are released by freeing the turnbuckles 188 from hooks 184. The bolts 190 are unscrewed from the sockets 196 in the cable harps 198, which remain in the casting. The bolts, which were preferably greased or treated for ease of removal from the casting, are not withdrawn. To strip the mold, the side forming members 20 are separated under the control of the toggle supports 22 (FIG. 1) and the T-beam 30 can be removed. The voids, left in the stem 30b of the beam by the removal of the bolts 190 (FIG. 5), can be filled with cement mortar.

While one form of apparatus for practicing the present invention has been described, it should be understood that various modifications can be made without departing from the spirit of the invention as defined by the appended claim.

The invention having thus been described, that which is believed to be new and desired to be protected by Letters Patent is:

Forming apparatus for a concrete T-beam comprising a casting bed, side forming members, each member having walls for forming the undersurfaces of the cross bar slab of the T-beam and walls for forming the side surfaces of the T-beam stem, each side forming member including laterally and vertically adjustable means adjacent the outer edge thereof for determining the width and the thickness of the T-beam slab, a pallet liner positioned between said members and having a wall for forming the bottom of the T-beam stem, a support spanning the side forming members, pallet liner elevating means connected between said support and said pallet liner for adjusting the elevation of said pallet liner relative to said casting bed, supporting means for pivotally supporting each side forming member for pivotal movement about an axis located below the elevation of said pallet liner wall, a pair of bearing blocks each connected to the casting bed adjacent a respective end of each of said supporting means, a pair of threaded members connected to each of said supporting means, each threaded member being operable to bear against a respective one of said bearing blocks and effect positive adjustment of the separation of the side forming members on said supporting means for permitting the use of pallet liners of various widths between said side forming members, and means connected to each side forming member for pivoting the respective members into engagement with the pallet liner, said pivoting means being releasable to permit the side forming members to pivot away from the pallet liner to thereby disengage the pallet liner and permit the elevation of the pallet liner to be adjusted by said elevating means.

References Cited in the file of this patent

UNITED STATES PATENTS

| | | |
|---|---|---|
| 2,100,479 | Henderson | Nov. 30, 1937 |
| 2,206,803 | Brimhall | July 2, 1940 |
| 2,453,223 | Henderson | Nov. 9, 1948 |
| 2,495,100 | Henderson | Jan. 17, 1950 |
| 2,825,115 | Williams | Mar. 4, 1958 |
| 2,916,795 | Henderson | Dec. 15, 1959 |
| 2,967,343 | Williams | Jan. 10, 1961 |
| 3,049,786 | Jones | Aug. 21, 1962 |

FOREIGN PATENTS

| | | |
|---|---|---|
| 280,801 | Great Britain | Nov. 24, 1927 |

OTHER REFERENCES

Construction Methods and Equipment Article, pages 102–104, May 1958.

Food Machinery Corp. Ad in Construction Method and Equipment, page 243, April 1959.